R. H. BOLIN.
GLASS DRAWING FURNACE.
APPLICATION FILED JUNE 2, 1908.

1,163,583.

Patented Dec. 7, 1915.
5 SHEETS—SHEET 1.

Witnesses
Inventor
R. H. Bolin
by Adrian Ozer
his Attorney

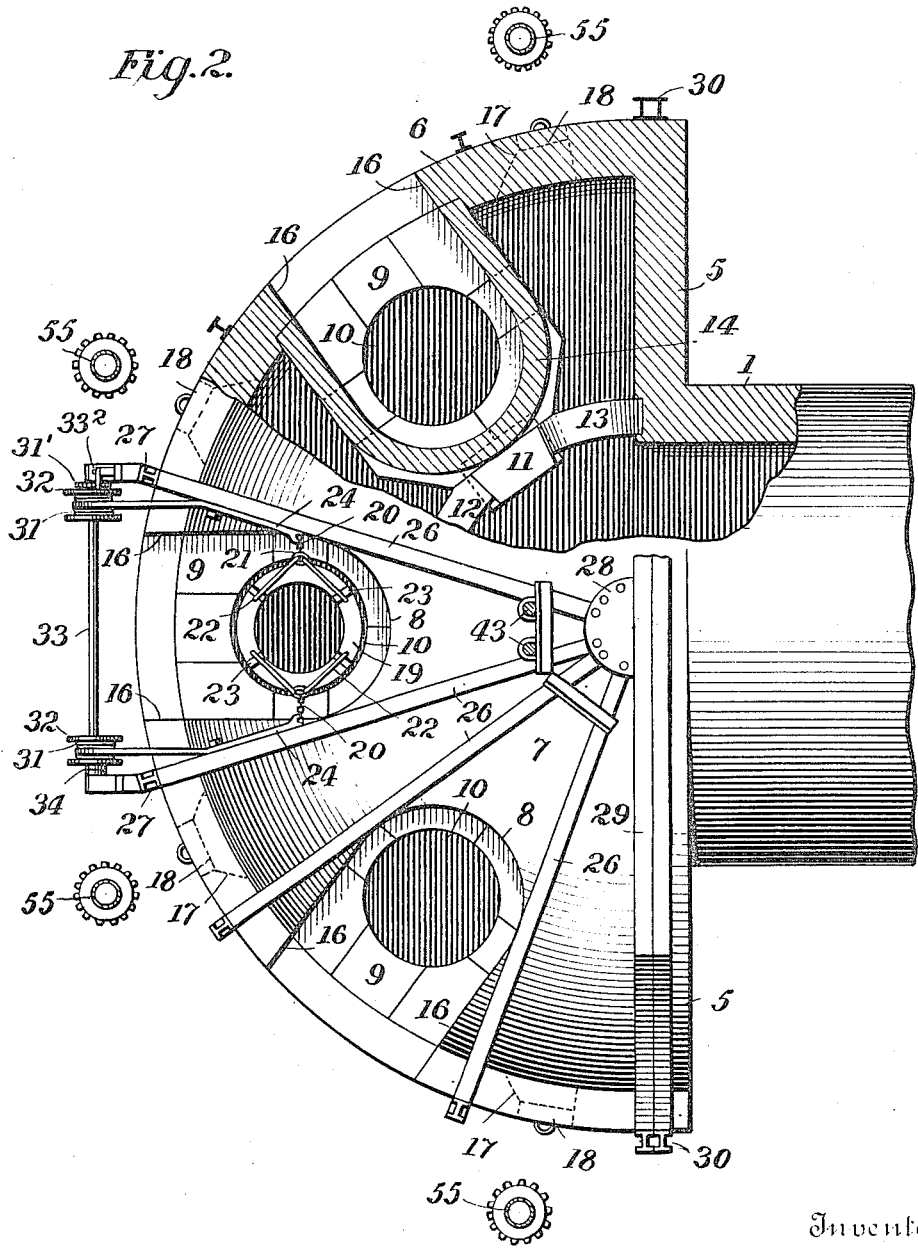

R. H. BOLIN.
GLASS DRAWING FURNACE.
APPLICATION FILED JUNE 2, 1908.
1,163,583.
Patented Dec. 7, 1915.
5 SHEETS—SHEET 3.
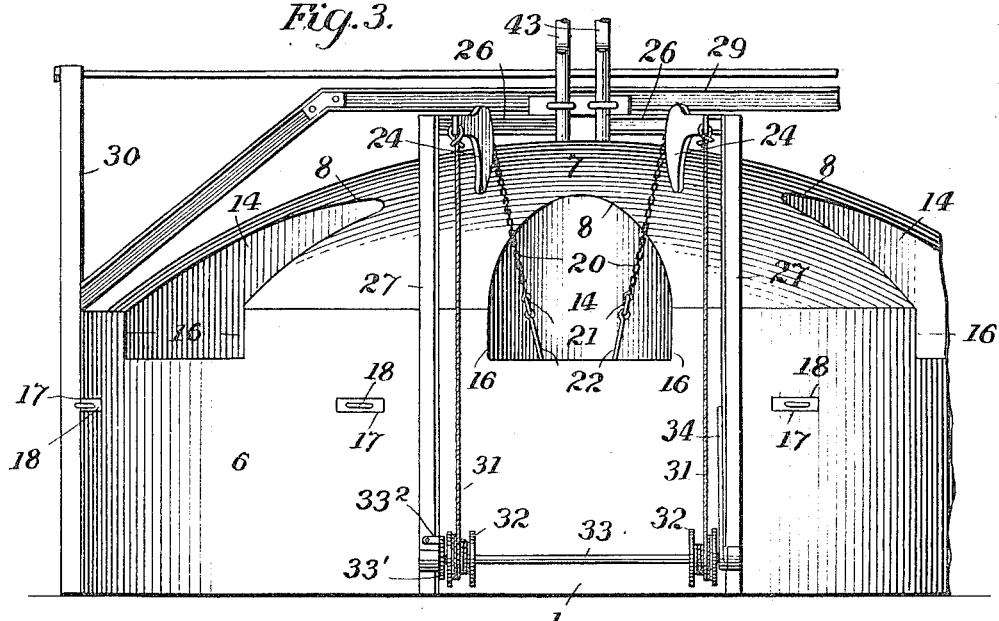
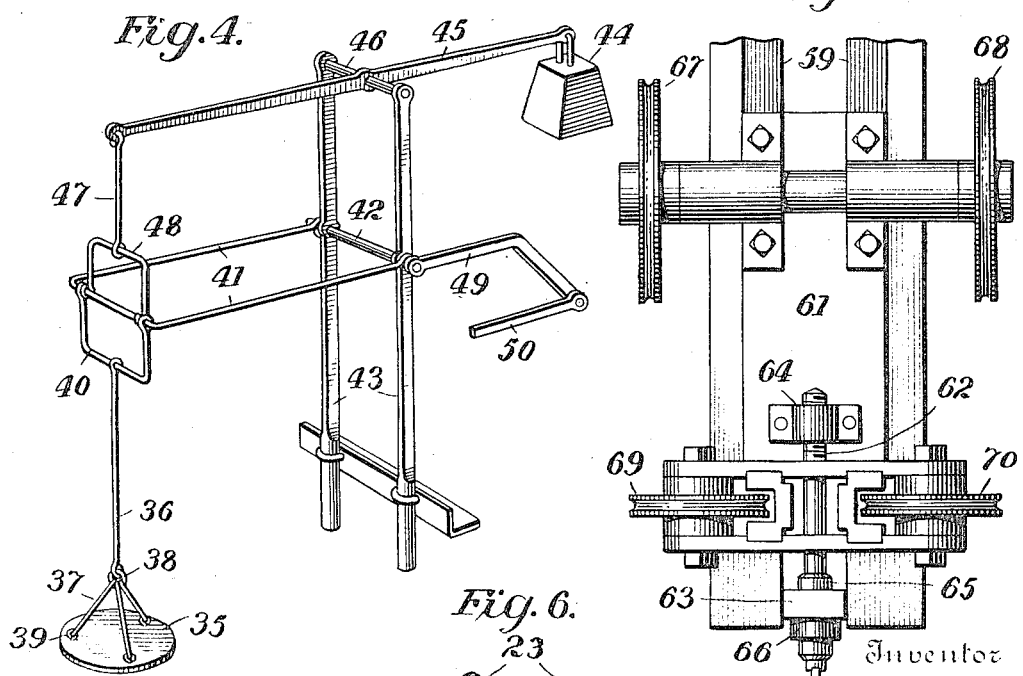
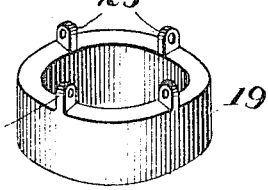

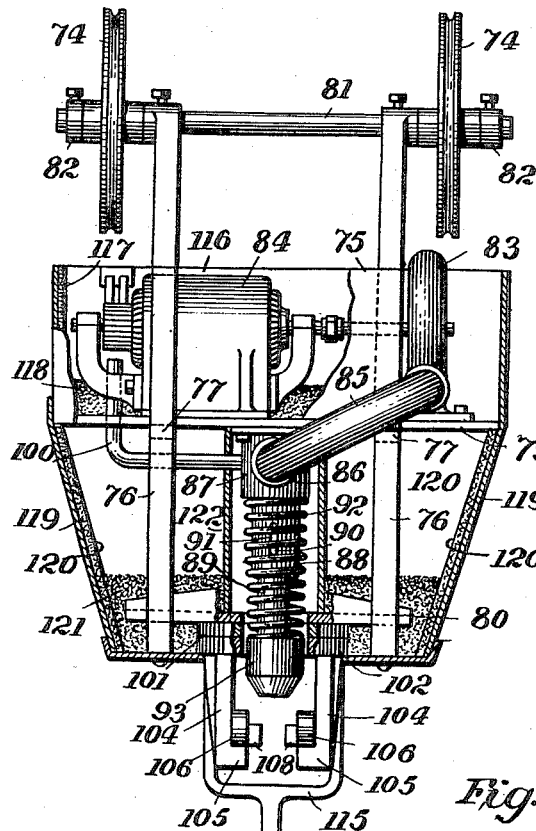
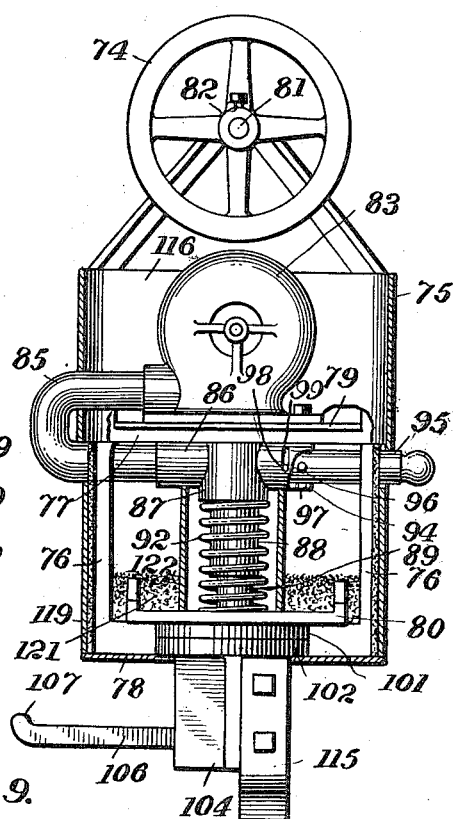
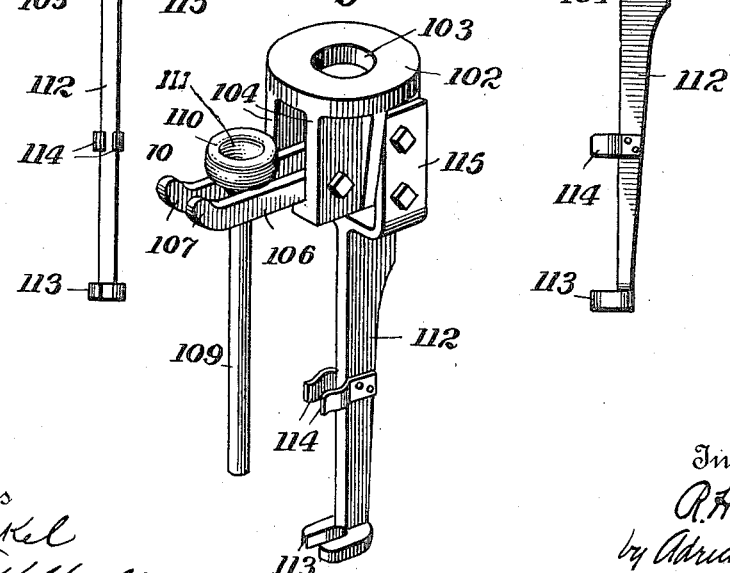

R. H. BOLIN.
GLASS DRAWING FURNACE.
APPLICATION FILED JUNE 2, 1908.

1,163,583.

Patented Dec. 7, 1915.
5 SHEETS—SHEET 5.

UNITED STATES PATENT OFFICE.

RICHARD H. BOLIN, OF KANE, PENNSYLVANIA, ASSIGNOR, BY MESNE ASSIGNMENTS, TO CONSOLIDATED MACHINE COMPANY, OF BRADFORD, PENNSYLVANIA, A CORPORATION OF DELAWARE.

GLASS-DRAWING FURNACE.

1,163,583.   Specification of Letters Patent.   Patented Dec. 7, 1915.

Application filed June 2, 1908. Serial No. 436,283.

*To all whom it may concern:*

Be it known that I, RICHARD H. BOLIN, a citizen of the Dominion of Canada, residing at Kane, in the county of McKean and State of Pennsylvania, have invented certain new and useful Improvements in Glass-Drawing Furnaces, of which the following is a specification.

This invention relates to the art of what is known as "machine glass drawing" and has for its principal objects to eliminate as far as possible the use of manual labor, to improve the quality of the article produced, and to increase the capacity of manufacture by producing larger articles at each drawing operation than, to the knowledge of the applicant, has hitherto been practical.

Figure 1:
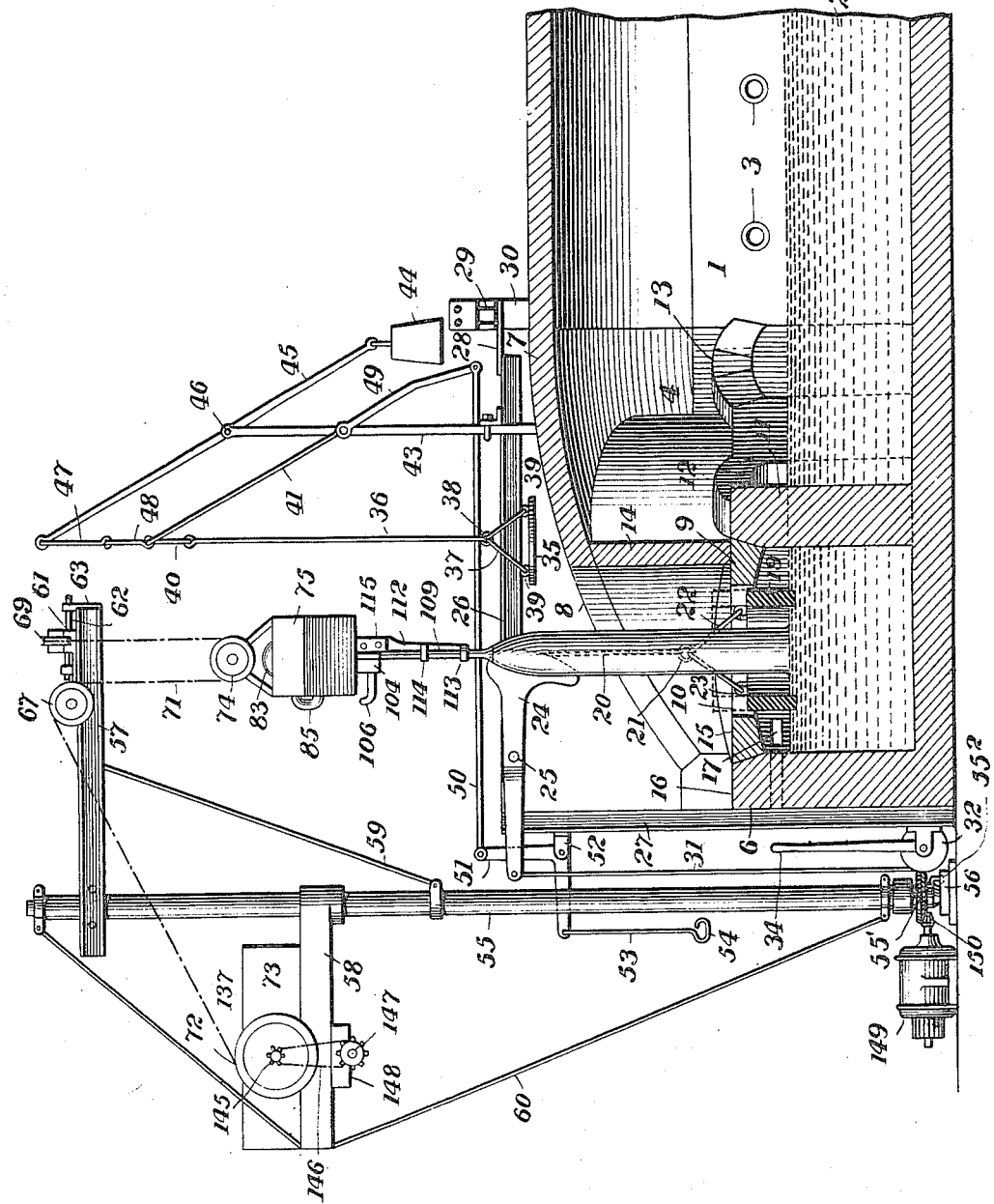
Figure 10:
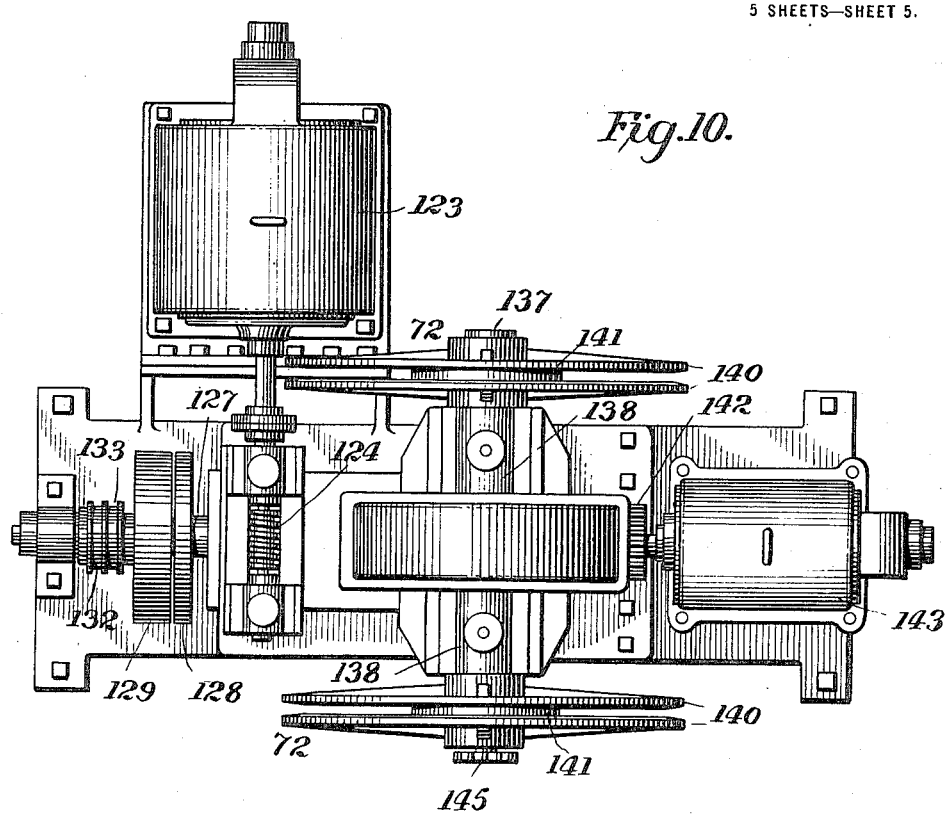

In order to more fully describe my said invention, reference will be had to the accompanying drawings which show a form of apparatus embodying my invention for carrying out my improved process, and wherein, Figure 1, is a fragmentary sectional view, partly in elevation, of said apparatus showing the same in the act of drawing a glass cylinder; Fig. 2, a top plan view, partly in section, of the glass tank with some of the accessories shown in Fig. 1 removed; Fig. 3, a fragmentary front elevation of the parts shown in Fig. 2; Fig. 4, a detail perspective view of the lever mechanism for supporting and hoisting the covers for the drawing rings; Fig. 5, a detail top plan view of the cable equalizing mechanism for the drawing crane; Fig. 6, a detail perspective view of one of the drawing rings, Fig. 7, a vertical central section partly in side elevation of the blower carriage and connected parts; Fig. 8, an end elevation partly in section of the parts shown in Fig. 7; Fig. 9, a detail perspective view of the blowpipe supporting bracket showing a portion of a blowpipe thereon slid forward out of its normal operative position; Fig. 10, a top plan view of the hoisting drums of the drawing mechanism; and Fig. 11, a vertical section thereof partly in elevation.

Referring to the accompanying drawings, 1 represents a glass tank containing molten glass 2, the heat to which may be supplied through burners 3 in the usual or any desired way. Except as to that portion of the tank where the drawing takes place, this tank may be of any desired construction; but as to said glass drawing portion, it is of novel construction especially adapted to the carrying out of my improved process.

In carrying out this part of my invention, I provide the tank, in the case shown, with a nose 4 constructed by building out from the main side walls of the tank, wing walls 5, which are joined at their outer edges by a wall 6 built on the arc of a circle, the said nose being provided with a dome-like curved top 7, in which are made a series of substantially horse shoe shaped openings 8 of any desired number. In the nose of the tank are a series of more or less flat arches 9, of refractory material, arranged beneath the respective openings 8, and each of these arches is itself provided with a central opening 10 passing through it. These arches 9 are supported at their outer ends upon the front wall 6 of the tank and at their inner ends each upon a separate pier 11 of a series of refractory piers rising from the bottom of the tank to a point above the normal level of the glass 2 therein. These piers 11 are braced by arches 12 extending from pier to pier and by arches 13 extending from the end piers to the side walls of the tank. The space above the openings 10 in the arches 9 is walled in back and sides by walls 14 of a suitable refractory material extending from said arches up to the tank top. Each of the arches 9 is cut away to form a substantially flat upper face 15, and the front wall 6 of the tank nose is cut away as at 16 in front of each of said arches down to a line with the flat upper faces of said arches.

Extending through the front wall 6 of the tank nose are a plurality of openings 17, which are provided for the purpose of commingling the glass as hereinafter described. These openings remain normally closed by the insertion therein of blocks of refractory material 18.

Mounted for vertical movement in each of the openings 10, is a ring 19 of refractory material, the outside diameter of which is slightly smaller than the diameter of said openings and concentric therewith so as to closely fit the inner edge of said openings and yet to be free to move up and down therein. These rings may be supported for such movement in a variety of ways. In the accompanying drawings, the arrangement which I have shown for this purpose consists in suspending the rings from cables 20 attached through rings 21 and links 22 to refractory lugs 23 on the rings, and secured to sector levers 24 fulcrumed as at 25 in suitable frames. The frame work for supporting the levers may consist of horizontal I beams 26 supported at their outer ends upon vertical I beams 27 and at their inner ends by being bolted or otherwise made fast to a bracket 28 secured to a cross frame consisting of I beams 29 extending across the top of the tank and supported at each end upon uprights 30, at the sides of the tank. The levers 24 may be operated by securing to their power arms cables 31 which are adapted to wind upon drums 32 connected by shaft 33 and provided with a lever 34 for rotating the same. The ring 19 may be held in the desired position by means of the ratchet 33' on the shaft 33 and pawl 33² mounted on the stationary frame work. By this arrangement of the two sector levers, each ring may be moved uniformly and the ring thus lowered evenly into the glass, which is important. The provision of refractory lugs integral with the rings 19 instead of the use of iron where the same may come in contact with the molten glass is also important, since the fusing of iron in the molten glass interferes decidedly with the drawing.

For each of the rings 19, I provide a removable cover plate 35 of refractory material, each of which, in the case shown, is suspended by a cable or rod 36 secured at one end through link and ring connection 37—38 to lugs 39 on the upper face of the cover, and at its other end to a frame 40 loosely secured to the yoke of a U-shaped frame 41 the arms of which are made fast to a shaft 42 mounted to turn in uprights 43 made fast to the I beams 26.

The cover 35 is counterbalanced by a weight 44, secured to one end of a lever 45 fulcrumed on a shaft 46 mounted in the upper ends of the uprights 43, the other end of said lever being connected through links 47 and 48 to the yoke of the frame 41. By thus counterbalancing the plate 35, very little power is required to raise it. For the purpose of operating this mechanism to raise and lower the covers 35, I make fast to the shaft 42 a crank arm 49 and connect this by a rod 50 to a bell crank lever 51 fulcrumed in a bracket 52 secured to one of the uprights 27. For the purpose of operating the bell crank levers 51, I may attach to each a rod 53 with a handle 54. By means of this arrangement the covers 35 may be easily lifted from the rings, and in rising from the rings the covers travel back out of the way of the drawing mechanism, so as not to interfere with the drawing of the cylinder.

In the form of the apparatus shown, there is located just to one side of each of the glass drawing openings in the tank nose a crane consisting each of a preferably tubular upright 55 revolubly mounted at its lower end in a suitable bearing 56 and provided with a boom 57 and a platform 58, these being braced respectively by stay rods 59 and 60. The upright 55 may be provided with a pivoted latch 55' and the bearing 56 with a hole 55² adapted to receive said latch and thus lock the crane against rotation during the drawing.

The boom 57 consists of two parallel I beams made fast at one end to the upright 55 and carries a carriage 61 adjustable longitudinally of said boom by means of a screw 62 passing through a bracket 63 fast on the boom and a screw threaded bracket 64 fast on the carriage, said screw being held fast against lateral movement by collars 65 and 66 on opposite sides of bracket 63. On this carriage, suitably mounted for rotation, are four pulleys 67, 68, 69 and 70, the first two being arranged to rotate in a plane longitudinally parallel to said boom and the last two in a plane transverse to said boom, as shown. These are the equalizing pulleys for a supporting cable 71 (see Fig. 1), which passes from one drum 72 of a hoisting mechanism 73 mounted on platform 58 over pulley 67, down under one pulley 74 on a carriage 75 which carries the blowing mechanism, up and over pulleys 69 and 70, down under the other pulley 74 on carriage 75, up over pulley 68 and thence back to the other drum 72 of the hoisting mechanism, thus supporting said mechanism freely suspended. This cable equalizing mechanism is very important for preventing any side movement or tilting of the carriage 75 which would have a tendency to throw the blowpipe out of alinement. It is very important that the blowpipe ascend from the glass in a straight line.

The carriage carrying the blowing mechanism proper is shown most clearly in Figs. 7 and 8, and comprises, among other parts, two substantially parallel brackets 76 having cross pieces 77 and 78 adapted to support platforms 79 and 80 respectively. In the upper ends of the brackets 76 is mounted a shaft 81 and on this shaft outside of the brackets are loosely mounted the pulleys 74, the latter being held from lateral movement on shaft 81 by rings 82 and the upper ends of the brackets 76.

The air blast is delivered to the blowpipe from a small rotary blower 83 mounted on platform 79 and directly connected to an electric motor 84 also mounted on said platform. The outlet from said blower connects through a pipe elbow 85 to an inlet 86 of a pipe connection 87 secured to the lower side of the platform 79. The pipe connection 87 has a main air outlet through a hollow extension or sleeve 88, into which fits a tube 89. The tube 89 is adapted to slide in the sleeve 88, this movement being limited by a pin 90 on said tube working in a slot 91 in said sleeve. The tube 89 is movable in said sleeve 88 under tension of a coil spring 92 held between the coupling 87 and a head 93 on the end of the tube 89. The coupling 87 is provided with another outlet through hollow extension 94 into which fits a tubular valve 95 open at its end which fits into the extension 94 and closed at its opposite end. This valve is provided with a port 96, which, by rotating the valve 95, may be brought into alinement with port 97 in the extension 94, thus permitting a portion of the air from said blower to escape through said port. Longitudinal movement of the valve 95 is prevented by pin 98 thereon working in a slot 99 in the sleeve 94. Obviously by varying the degree with which the port 96 and 97 register with each other, the outflow of air therethrough may be varied. No variation of the air outlet through said valve takes place during the drawing. The valve is set when the apparatus is installed and is not changed at all unless this is desired.

A blast of air is delivered against the motor commutator during the operation of the blower through a small pipe 100 leading from the connection 87 to a point near the motor commutator as shown. This is quite important inasmuch as the motor is subject to great heat during the drawing operation.

Secured to a plate 101 on the lower side of the platform 80 is a bracket 102 having an opening 103 through its top to admit the head 93 of the tube 89, and having side wings 104 with inturned ends 105. Resting on these inturned ends and bolted securely to the wings 104 are two parallel arms 106 projecting out in front of the bracket 102 and terminating at said projecting ends at the upturned portions 107. The ends of said arms 106 within the wings 104 are turned inward as at 108. These arms 106 receive and support the blowpipe 109, the stem of the latter passing down between said arms and its head 110 resting thereon, as shown most clearly in Fig. 9, where the blowpipe is shown slid forward of its normal position. In its normal operative position the blowpipe rests between the wings 104 with the tapered head 93 of the coupling 89 projecting into the tapered opening 111 in the head of the blowpipe. The blowpipe is steadied against lateral movement by the depending arm 112 provided at one end with two fingers 113 between which the stem of the blowpipe fits. A spring clip 114 on said arm also engages the stem of the blowpipe and further prevents lateral movement thereof in its support during the drawing operation. The upper end of the arm 112 terminates in a yoke 115, the side members of which are bolted to the wings 104 of the bracket 102.

As a protection against the intense heat arising from the glass in the tank during the drawing operation the blower motor 84 is surrounded by a metal casing 116 which is preferably lined on the inside with asbestos sheeting 117, while around the base of the motor is placed asbestos packing 118. An additional metal casing 119 incloses the lower portion of the carriage and extends around the blower 83. This latter casing is also lined with asbestos sheeting 120 and in its bottom is a thick layer of asbestos 121. A tube 122 surrounds the spring 92 so that the packing 121 may be extended up as high as desired.

Figure 11:
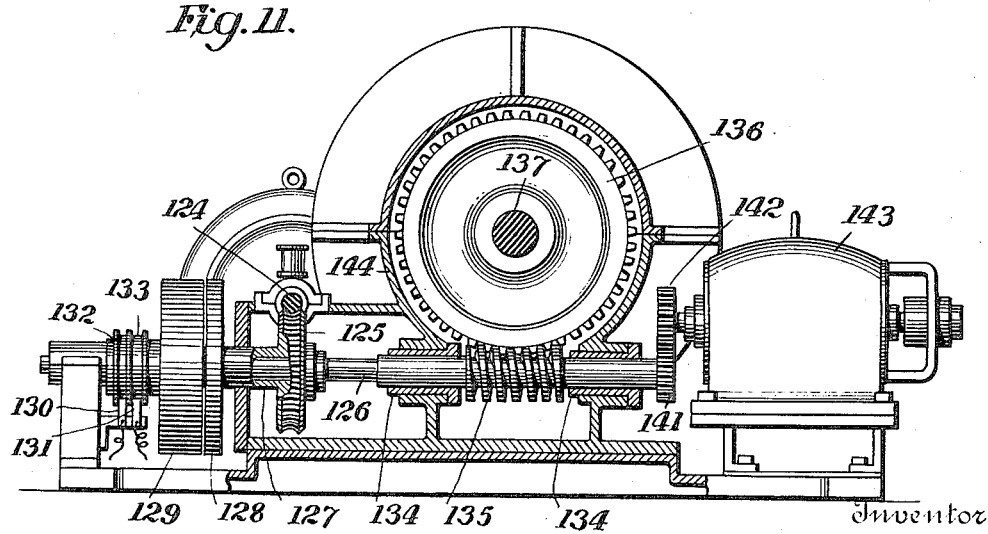

The hoisting mechanism for raising and lowering the blowpipe carriage is shown in detail in Figs. 10 and 11 where 123 represents a low speed shunt wound motor, the armature shaft of which is direct connected to a worm 124 which meshes with a worm gear 125 rotatable on a main driving shaft 126. The gear 125 is made fast by means of a sleeve 127 to one of the clutch members 128 of a magnetic clutch, the said clutch member being mounted to rotate relatively to the shaft 126, but held against lateral movement thereon, and constituting what is known as a fixed clutch member. The other clutch member 129 is fixed upon the shaft 126 to rotate therewith, but is slidable longitudinally thereon. Current to operate the clutch is led into and out of the same by means of brushes 130, 131 engaging collector rings 132 and 133 respectively.

I do not claim as a part of my invention any specific form of magnetic clutch so that further description of the details thereof is not necessary.

The shaft 126 is mounted in bearings 134 between which it carries a worm 135 which in turn meshes with a gear 136 mounted fast on a shaft 137 journaled in suitable bearings 138. Mounted fast on a shaft 137 outside of bearings 138 are the two cable drums 72, 72, consisting each of a narrow sleeve on each side of which is a flange or shield 140, the space between said shields being substantially equal to the thickness of the cable.

On the end of the main driving shaft 126 opposite the magnetic clutch is keyed a pinion 141 which meshes with a gear 142 on the armature shaft of a small high speed motor 143.

144 represents a housing inclosing the gears 125, 135 and 136.

On one end of the drum shaft 137 is mounted a sprocket wheel 145 which is geared through sprocket chains 146 to a sprocket 147 which drives the contact arm of a rheostat 148 which automatically controls the speed of the blower motor as hereinafter more fully described.

The crane may be rotated by gearing the upright 55 though gears 150 to an electric motor 149, or if desired the said crane may be rotated by hand or in any desired way.

One way of performing my improved process, and the operation of the apparatus herein shown and employed in carrying out said process is as follows:—It is assumed that the crane carrying the blowing mechanism is turned to a position substantially 180° from that shown in Fig. 1, and that the cover 35 is resting upon the top of ring 19, which latter is drawn up to the dotted line position shown in Fig. 1, out of the molten glass. An attendant then pulls down on rod 53, which will cause cover 35 to rise and shift back to the position shown in Fig. 1. The pawl 32² is then released from its ratchet 32′ (see Figs. 2 and 3) and an attendant by means of lever 34 gradually lowers ring 19 into the glass substantially to the position shown in solid lines in Fig. 1. The blowpipe having its bait end heated is then slipped into the jaws 107 and pushed back until its stem is engaged by the spring clip 114, and until the nozzle 93 engages the opening in the upper end of the blowpipe. The crane motor 149 is started up in a direction to swing the crane to the position shown in Fig. 1 with the blowpipe directly over the center of ring 19. This position may be determined each time by the latch 55′ dropping into the opening 55², thus locking the crane in position. The blower carriage and bait are then lowered until the lower end of the bait is submerged, and during the descent the blower motor 84 is started up. By now starting motor 123 the blowpipe will be slowly drawn upward from the glass. During the formation of the cap of the cylinder and until the cylinder is about one-fourth drawn the operator at the switchboard regulates the speed of the blower motor and therethrough the blast to the cylinder, and also regulates the speed of the hoisting motor. The speed of the blower carriage upward will, however, be automatically accelerated by the hoisting cable winding upon itself on the drums 72 since each convolution of the cable increases the diameter of the surface upon which the cable is wound.

The rotation of the shaft of the cable drums, imparts through sprocket gearing 145, 146 and 147, rotation to the contact arm of rheostat 148, bringing this arm into engagement with the first contact point of the resistances at about the time that the cap is formed. Then as the blowpipe is gradually drawn upward, the contact of rheostat 148 gradually cuts out resistance from the circuit of blower motor 84, automatically causing said motor to gradually accelerate its speed and thereby gradually increasing the air blast delivered to the cylinder.

When the cylinder is drawn to the desired length, it is cut off near its lower end in any desired way. The latch 55′ is then raised and by the crane swung around by the motor 149, or, if desired manually, with the cylinder hanging from the blowpipe. The cylinder being thus clear of the drawing opening in the tank, the lowering motor is again started and the cylinder lowered. At the same time that it is thus being lowered, it is pushed out to a horizontal position, the blowpipe sliding forward on the arms 106, but being prevented from slipping off said arms by their upturned ends. The blowpipe, still attached to the cylinder, is then removed from its supporting bracket and the cylinder placed in proper position for "capping off" which latter may be done in any desired way.

Immediately after the cylinder is swung clear of the drawing opening in the tank, an attendant by operating lever 34 raises ring 19, say to the dotted line position shown in Fig. 1, and then lowers cap 35 to cover said ring. He then removes the cover 18 from an adjacent opening 17 and by means of a long rod inserted therethrough commingles the glass in the zone in which the drawing took place, which glass has become more or less cooled in the drawing, with the more highly heated surrounding glass as for example by pushing the cooled glass from the drawing zone into the surrounding glass. The glass in the drawing zone will then very quickly become of uniform temperature with the rest of the glass in the tank. As soon as the attendant has finished this operation of commingling the glass, he closes the opening 17 so as to allow the reheating to take place as quickly and as effectively as possible.

After the glass in the drawing zone has become properly heated, the ring 19 may again be lowered thereinto and another cylinder drawn as herein above described. By lowering the ring 19 through the opening in the arch 9, for example, as described, I create a drawing zone in the main body of the glass in the tank which is more or less shut off from the surrounding heat in the tank. This zone, however, in the present case is only temporary, since at the end of each drawing, the zone is merged as it were into the surrounding glass by the raising of the ring 19 and the commingling of the chilled glass with that surrounding it. In the creation and the abolition of this zone, I do not, however, wish to confine my invention specifically to raising and lowering a ring, such as 19, except where this is specifically pointed out in the claims.

I also do not wish to be understood as confining my invention to a ring of the specific form shown, since this may be a body of any desired shape; and many other changes and modifications may be made in my said invention without departing from the spirit thereof.

What I claim is:—

1. Glass working apparatus, comprising a glass tank having a plurality of refractory piers therein, refractory arches forming bridges above the glass level in said tank and extending from said piers to the walls of the tank, said arches being each provided with a glass drawing opening therethrough, and a wall built up from each of said arches around said opening therein to the tank top.

2. Glass working apparatus comprising a glass tank having a plurality of refractory piers therein, refractory arches extending from between said piers, and refractory arches above the glass level in said tank extending from the said piers to the wall of the tank, each of the last named arches being provided with a glass drawing opening therethrough.

3. A glass melting tank having an opening through its top or crown, a fixed flat top stone located below and within the plane of said opening in the top or crown, and side and back walls or shades resting on said top stone and extending up to the top or crown, the said flat top stone having a drawing opening through same.

4. A glass melting tank having an arched top or crown, an opening through said top adjacent a wall of the tank, a fixed flat top stone located below and in the vertical plane of said opening, and side and back shades extending from the top stone to the arched top.

5. A glass melting tank having an arched top or crown, an opening through said top adjacent a wall of the tank, a pier within the tank in a plane at the rear of said opening in the top, a fixed flat top stone resting on said pier, and side and back shades extending from the top stone to the arched top.

In testimony whereof I affix signature in presence of two witnesses.

RICHARD H. BOLIN.

Witnesses:
R. P. YERDON,
AUGUST SIZER.